United States Patent [19]
Cusack et al.

[11] Patent Number: 6,153,789
[45] Date of Patent: Nov. 28, 2000

[54] PURIFICATION OF AQUEOUS DYE SOLUTIONS

[75] Inventors: Kevin P. Cusack, East Greenbush; Kwang Kim, Schenectady; Dennis L. Edie, Delmar; Benjamin S. Tennyson, Saratoga Springs, all of N.Y.

[73] Assignee: BASF Corporation, Southfield, Mich.

[21] Appl. No.: 09/340,702

[22] Filed: Jun. 29, 1999

[51] Int. Cl.[7] .................. C07C 209/28; C07C 251/04
[52] U.S. Cl. .............. 562/59; 562/43; 562/67; 564/250; 564/279; 568/306; 568/438
[58] Field of Search .................. 562/43, 59, 67; 564/250, 279; 568/306, 438

[56] References Cited

PUBLICATIONS

Database Caplus on STN, Acc. No. 1975:98725, Furuhashi et al., [Removal of aldehydes and ketones.]JP 49095920 A2 (abstract), 1975.

*Primary Examiner*—Johann Richter
*Assistant Examiner*—Brian J. Davis

[57] ABSTRACT

The present invention provides a method of purifying an aqueous dye solution having an aldehyde and/or ketone impurity including a step of reacting the impurity with a hydrazine derivative, forming a water-insoluble hydrazone compound. The hydrazone compound is then removed from the solution to form a dye having an increased purity.

9 Claims, No Drawings

PURIFICATION OF AQUEOUS DYE SOLUTIONS

BACKGROUND OF THE INVENTION

1. Technical Field

The present invention relates generally to a method of purifying aqueous dye solutions, and more particularly to removing aldehyde and/or ketone impurities from aqueous dye solutions to form dyes with an increase in purity.

2. Discussion

Certain dyes produced as aqueous solutions may be used in foodstuffs and packaging for foodstuffs. For example, the dye Color Index Acid Blue 9, which chemically is N-ethyl-N-[4-[[4-[ethyl[(3-sulfophenyl)methyl]amino]phenyl](2-sulfophenyl)methylene]-2,5-cyclohexadien-1-ylidene]3-sulfobenzenemethanaminium hydroxide inner salt, disodium salt, has been approved by the United States Food and Drug Administration for use in food, drugs, and cosmetics. Acid Blue 9 is currently used as a dye in various applications, such as in cleaning products, ponds, golf courses, and foodstuffs. When used as an additive in foodstuffs, however, certain strict standards of purity must be met.

Other dyes that are used in paper products for packaging foodstuffs, such as cardboard egg and apple cartons, must also have increased purity levels. For example, in the formation of Color Index Basic Violet 1, referred to as Methyl Violet, Michler's ketone, 4,4'-bis(dimethylamino) benzophenone, is produced as a by-product. Michler's ketone is a suspected carcinogen and must be removed from the Basic Violet 1 solution before the dye can be used with food packaging.

Dyes that are not intended to be used as food coloring agents may contain large amounts of impurities that do not affect the use of the dyes. When dyes are to be used as food coloring agents, they must be further purified. Typically, the dyes for food coloring are separated from the impurities by crystallization of the dyes. The equipment required to conduct this crystallization procedure, however, can be costly. Acid Blue 9 is particularly expensive to produce in food grade quality because it is highly soluble in water, resulting in a low yield of dye product after crystallization. An alternative method of removing impurities to produce food grade dyes is to salt out a dye from solution by adding a salt to the solution. This method can also be expensive because of the cost of the particular salt needed and loss of product. Additionally, the salting out method does not sufficiently increase the purity of a dye solution.

Other methods currently used for purifying dyes to food grade purity include nanofiltration and ultrafiltration. These procedures also have many disadvantages, including the requirement of specific equipment to conduct the procedures and the loss of product during the filtration process.

There thus exists a need in the art for a method of purification of aqueous dye solutions that are used as coloring agents for food and food packaging.

SUMMARY OF THE INVENTION

The present invention provides a method of purifying an aqueous dye solution containing an aldehyde and/or ketone impurity including a step of reacting the impurity of the dye solution with a hydrazine derivative to form a water-insoluble hydrazone compound. The hydrazone compound is then removed from the solution to form a dye having an increased purity. In a preferred embodiment, the purified dye solution formed has food grade purity.

The present invention also provides a method of preparing a food grade purity dye including providing an aqueous dye solution having an aldehyde impurity and reacting the aldehyde impurity with a hydrazine derivative to form a water-insoluble hydrazone compound. The hydrazone compound is then removed from the dye solution to provide a food grade purity dye.

The present invention further provides a method of preparing food grade purity Acid Blue 9 that includes reacting ethyl benzyl aniline sulfonic acid with benzaldehyde-2-sulfonic acid, forming a leuco compound. The leuco compound is then mixed with an oxidizing agent, forming a product mixture of Acid Blue 9 and aldehyde impurities. The aldehyde impurities of the product mixture are reacted with a hydrazine derivative, forming a hydrazone compound. The hydrazone compound is removed to form food grade purity Acid Blue 9.

The present invention also provides a dyestuff that has been purified by reacting an aldehyde and/or a ketone impurity of an aqueous dye solution with a hydrazine derivative to form a substantially water-insoluble hydrazone compound. The hydrazone compound is then removed to form a dyestuff having an increased purity.

DETAILED DESCRIPTION OF THE INVENTION

The present method may be employed with any aqueous dye solution that requires the removal of an aldehyde or ketone impurity. The aldehyde or ketone impurity is reacted with a hydrazine compound to form a substantially water-insoluble product. Dyes that have these impurities include Acid Blue 9, Basic Violet 1, and their derivatives. Acid Blue 9 must be purified to obtain food grade purity, while Basic Violet 1 must be purified to be used in packaging for foodstuffs. The method of the present invention removes aldehyde and/or ketone impurities from the reaction mixture of the synthesis of the aqueous dye, including Acid Blue 9 and Basic Violet 1, through aryl hydrazone formation. The hydrazone compound formed is water insoluble and can be removed from the resultant dye solution by conventional means such as filtration, resulting in a high purity dye product.

In one embodiment of the present invention, Acid Blue 9 may be obtained by the following synthesis:

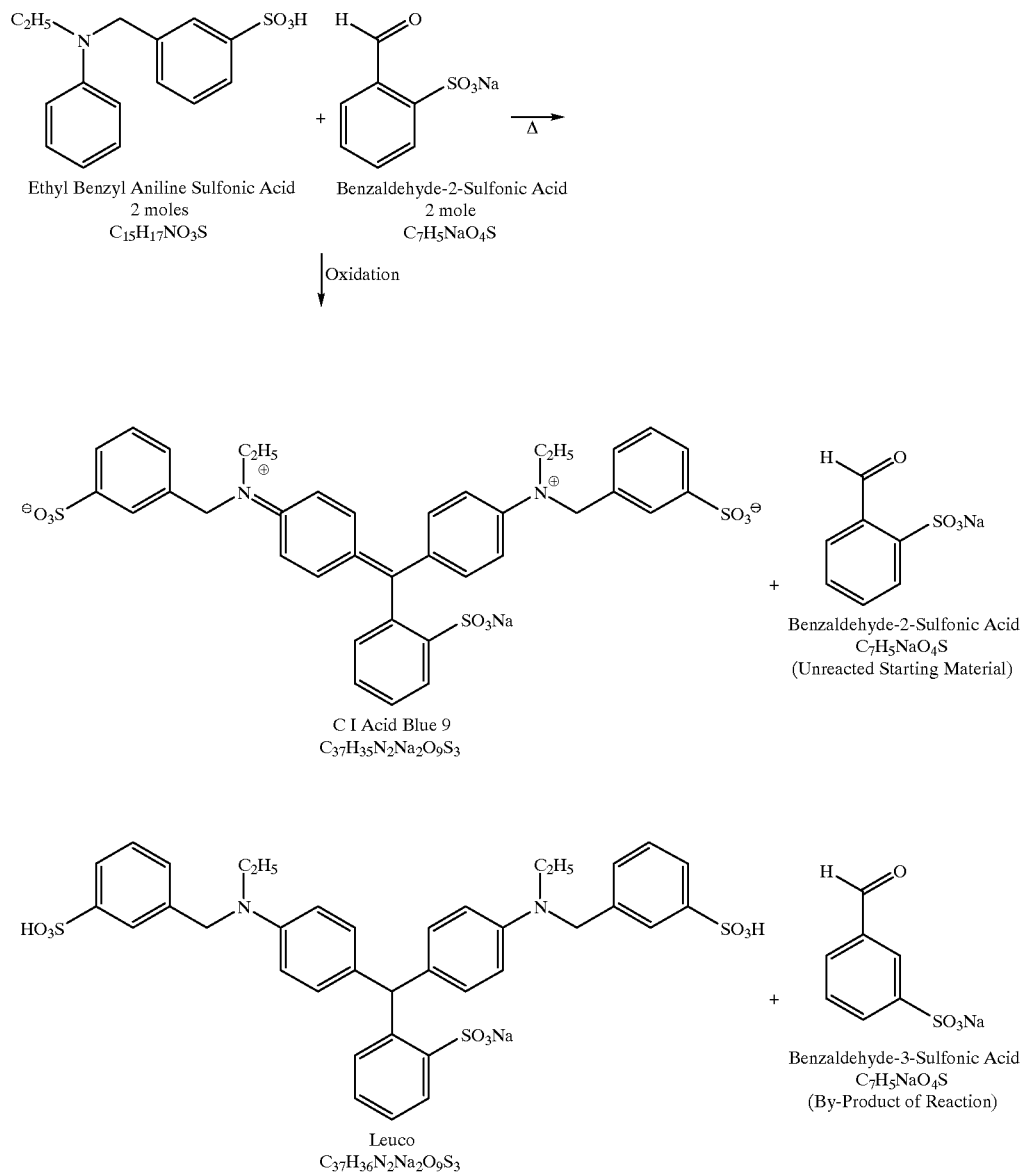
The resulting impurities of the Acid Blue 9 mixture are then reacted with a hydrazine compound, such as 2,4-dinitrophenylhydrazine, forming aryl hydrazone compounds, according to the following synthesis:

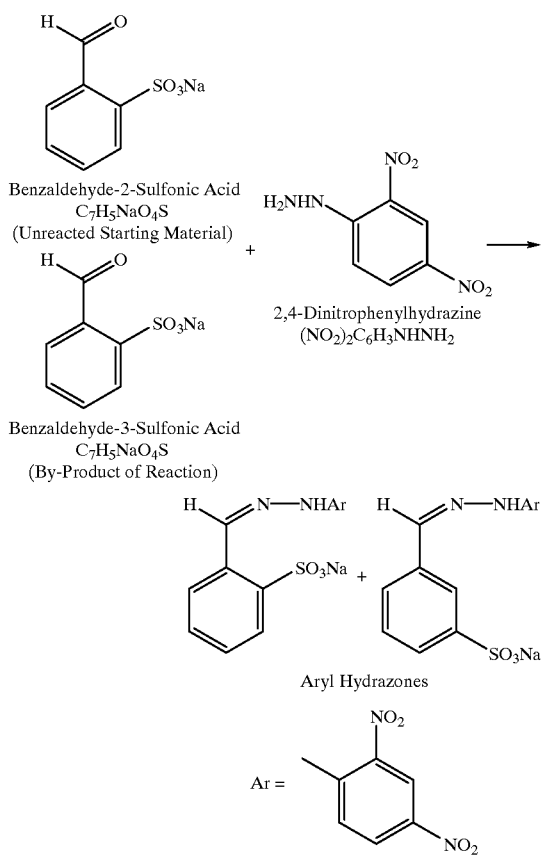

Basic Violet 1 may be obtained by the following synthesis:

The resulting Michler's ketone impurities of the Basic Violet 1 mixture are then reacted with a hydrazine compound, such as 2,4-dinitrophenylhydrazine, forming substantially water-insoluble aryl hydrazone compounds, according to the following synthesis:

The hydrazine compound employed in the present invention can be any hydrazine derivative that reacts to form an insoluble hydrazone compound that may be removed from the final reaction mixture preferably through conventional means. Suitable examples of hydrazine compounds include, without limitation, 2,4-dinitrophenylhydrazine, phenylhydrazine, tolylhydrazine, 1-methyl-1-phenylhydrazine, benzylhydrazine, 3-hydroxybenzyl hydrazine, 4-methoxyphenyl hydrazine, 2,3-dimethylphenyl hydrazine, 2,4-dimethylphenyl hydrazine, and 2,5-dimethylphenyl hydrazine. Preferred hydrazine compounds are 2,4-dinitrophenylhydrazine and phenylhydrazine.

The impurities that can be removed include the benzaldehyde compounds found in the Acid Blue 9 synthesis mixture, benzaldehyde-2-sulfonic acid, which is unreacted starting material, and benzaldehyde-3-sulfonic acid, which is a by-product of the Acid Blue 9 synthesis. These organic aldehyde impurities are typically at a level of about 0.5 to about 3.0% by weight of the crude liquid. The impurities are preferably removed by the present method without the addition of excess hydrazine to the reaction mixture, as the purified dye product preferably does not contain any unreacted hydrazine compound.

The hydrazone compound formed by the reaction between hydrazine and the aldehyde and ketone impurities is a water-insoluble solid that may be filtered from the dye reaction mixture using conventional filtering methods. In one preferred embodiment, the hydrazone compound is removed through a stationary filter using diatomaceous earth, which can filter out particles less than 100 microns in diameter. The presence of any aldehyde and ketone impurities remaining in the dye solution can be detected through the use of methods known in the art, such as high-performance liquid chromatography (HPLC) with an ultraviolet detector or mid-infrared (MIR) detector, and removed by reaction with further hydrazine derivative until the desired purity is obtained.

In a preferred embodiment of the present invention, the purified Acid Blue 9 dye solution is at least about 85% food grade purity level, which meets the 1999 federal government requirements. The dye solution more preferably has a purity of at least from about 85% to about 95%. The purified Basic Violet 1 dye solution preferably contain 100 parts per million (ppm) or less of the Michler's ketone. Although there are no federal requirements with regard to the amount of Michler's ketone allowed in dyes used for food packaging, the current standard in the industry is to produce dyes with not more than 100 ppm of Michler's ketone.

Following purification by removal of the hydrazone compound, the dye solutions may be dried according to procedures known in the art, such as spray drying, pan drying or drum drying. According to federal requirements, Acid Blue 9 must be dried and sold as a powder, whereas Basic Violet 1 may remain as an aqueous solution.

The invention is further described in the following examples. The examples are merely illustrative and do not in any way limit the scope of the invention as described and claimed. Unless stated otherwise, all parts are parts by weight.

EXAMPLES

Example 1
Food Grade Purity Acid Blue 9

310.75 grams of crude Acid Blue 9 dye was placed in a 400 milliliter beaker and magnetically stirred. The crude sample contained 5.28 grams of aldehyde impurities or approximately 0.3% by weight of benzaldehyde-2-sulfonic acid and 1.4% by weight of benzaldehyde-3-sulfonic acid. 8.03 grams of 2,4-dinitrophenylhydrazine was added to the beaker and stirred. The reaction mixture was heated to about 55° C. at a pH of about 6.7 for approximately 60 minutes. The solution was then slowly filtered with diatomaceous earth to remove the formed aryl hydrazone compounds.

Analysis of the filtered dye solution by HPLC revealed that the aldehyde impurities had been substantially removed from the solution, such that the impurities were no longer detectable by HPLC with an ultraviolet detector. A test of the purity of the dye revealed an 85.2% purity level. Upon complete drying of the solution, an 89.5% food grade purity was obtained.

Example 2
Food Grade Purity Acid Blue 9 with Excess Hydrazine 310.7 grams of crude Acid Blue 9 dye was placed in a 400 milliliter beaker and magnetically stirred. The crude sample contained 5.3 grams of aldehyde impurities, with approximately 0.3% by weight of benzaldehyde-2-sulfonic acid and 1.4% by weight of benzaldehyde-3-sulfonic acid. Excess 2,4-dinitrophenylhydrazine, 24.1 grams, was added to the beaker and stirred. The reaction mixture was heated to about 55° C. at a pH of about 6.8 for approximately 60 minutes. 70 milliliters of water was then added to the mixture. A 16.0 centimeter Buchner funnel was precoated with 15.0 grams of diatomaceous earth in 200 milliliters of water. 5.0 grams of diatomaceous earth was then added to the mixture and the mixture was slowly filtered to remove the formed aryl hydrazone compounds. The mixture was refiltered through the Buchner funnel and filtered again through a 5.5 centimeter Whatman funnel.

Analysis of the filtered dye solution by HPLC revealed that the aldehyde impurities had been removed from the solution, such that the impurities were no longer detectable by HPLC with a ultraviolet detector. A test of the purity of the dye revealed a purity level greater than 85.0%. Upon complete drying of the solution, a food grade purity greater than about 89% was obtained.

Example 3
Basic Violet 1

100 grams of crude Basic Violet 1 is placed in a 400 milliliter beaker and magnetically stirred. The crude sample includes 0.07% by weight of Michler's ketone. A stoichiometric excess of 2,4-dinitrophenylhydrazine is added to the beaker and stirred. The reaction mixture is heated and stirred to cause the reaction of the 2,4-dinitrophenylhydrazine with the ketone to form the insoluble aryl hydrazone product. The solution is then slowly filtered with diatomaceous earth to remove the aryl hydrazone.

The invention has been described in detail with reference to preferred embodiments thereof. It should be understood, however, that variations and modifications can be made within the scope and fair meaning of the invention and of the following claims.

What is claimed is:

1. A method of purifying an aqueous dye solution comprising a dye selected from the group consisting of Acid Blue 9, Basic Violet 1, derivatives thereof and mixtures thereof, containing an impurity selected from the group consisting of aldehydes, ketones, and mixtures thereof, comprising the steps of:
   a) reacting said impurity of said solution with a hydrazine derivative, forming a substantially water-insoluble hydrazone compound; and
   b) removing said hydrazone compound from said solution to form a dye having an increased purity.

2. The method of claim 1, wherein said impurity comprises a benzaldehyde compound.

3. The method of claim 2, wherein said benzaldehyde compound is selected from the group consisting of benzaldehyde-2-sulfonic acid, benzaldehyde-3-sulfonic acid, and mixtures thereof.

4. The method of claim 1, wherein said impurity comprises 4,4'-bis(dimethylamino)benzophenone.

5. The method of claim 1, wherein said hydrazine derivative is selected from the group consisting of 2,4-dinitrophenylhydrazine, phenylhydrazine, and mixtures thereof.

6. The method of claim 1, wherein said hydrazone compound is an aryl hydrazone.

7. The method of claim 1, wherein said dye with increased purity is of food grade purity.

8. A method of preparing food grade purity Acid Blue 9 comprising the steps of:

a) reacting ethyl benzyl aniline sulfonic acid with benzaldehyde-2-sulfonic acid, forming a leuco compound;

b) reacting said leuco compound with an oxidizing agent, forming a product mixture of Acid Blue 9 and an aldehyde impurity;

c) reacting said aldehyde impurity of said product mixture with a hydrazine derivative, forming a hydrazone compound; and d) removing said hydrazone compound from said product mixture to form food grade purity Acid Blue 9.

9. The method of claim 8, wherein said hydrazine derivative is selected from the group consisting of 2,4-dinitrophenylhydrazine, phenylhydrazine, and mixtures thereof.

* * * * *